United States Patent
Bell et al.

(10) Patent No.: US 7,560,418 B2
(45) Date of Patent: Jul. 14, 2009

(54) ADDITIVES FOR IMPARTING FRAGILE PROGRESSIVE GEL STRUCTURE AND CONTROLLED TEMPORARY VISCOSITY TO OIL BASED DRILLING FLUIDS

(75) Inventors: Stephen A. Bell, Houston, TX (US); William W. Shumway, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 484 days.

(21) Appl. No.: 11/244,801

(22) Filed: Oct. 6, 2005

(65) Prior Publication Data

US 2007/0082824 A1  Apr. 12, 2007

(51) Int. Cl.
*C09K 8/24* (2006.01)
*C09K 8/05* (2006.01)
*B01F 3/08* (2006.01)
*E21B 21/01* (2006.01)

(52) U.S. Cl. .................. 507/128; 175/65; 507/103; 507/140; 507/143; 516/24; 516/902; 516/928

(58) Field of Classification Search ............... 507/128, 507/103, 143, 140; 175/65; 516/24, 902, 516/928

See application file for complete search history.

(56) References Cited

U.S. PATENT DOCUMENTS

| 4,781,845 | A | 11/1988 | Syrinek et al. | |
| 6,887,832 | B2 | 5/2005 | Kirsner et al. | |
| 2003/0045605 | A1* | 3/2003 | Thompson | 523/130 |
| 2003/0144153 | A1 | 7/2003 | Kirsner et al. | |
| 2006/0211580 | A1* | 9/2006 | Wang et al. | 507/209 |

OTHER PUBLICATIONS

Hart's E&P Special Meritorious Award for Engineering Innovation 2003 MEA Winners, "Synthetic-base fluid reduces downhole losses," p. 102, Apr. 2003, www.EandPnet.com.

David Power, et al., "Flat rheology SBM shows promise in deepwater," Drilling Contractor, pp. 44-45 (May/Jun. 2003).

* cited by examiner

*Primary Examiner*—Timothy J. Kugel
(74) *Attorney, Agent, or Firm*—Craig W. Roddy; Karen B. Tripp

(57) ABSTRACT

Metal cross-linked phosphate ester compositions impart fragile progressive gel structure to a variety of oil and invert emulsion-based drilling fluids at neutral or acidic pH. The fluids are useful for drilling wellbores in subterranean formations without need for organophilic clays to suspend drill solids. At greater concentrations, metal cross-linked phosphate ester compositions enhance fluid viscosity for suspending weighting materials in drilling fluids during transport of the fluids, as from a manufacturing or mixing facility to a drilling site.

18 Claims, 1 Drawing Sheet

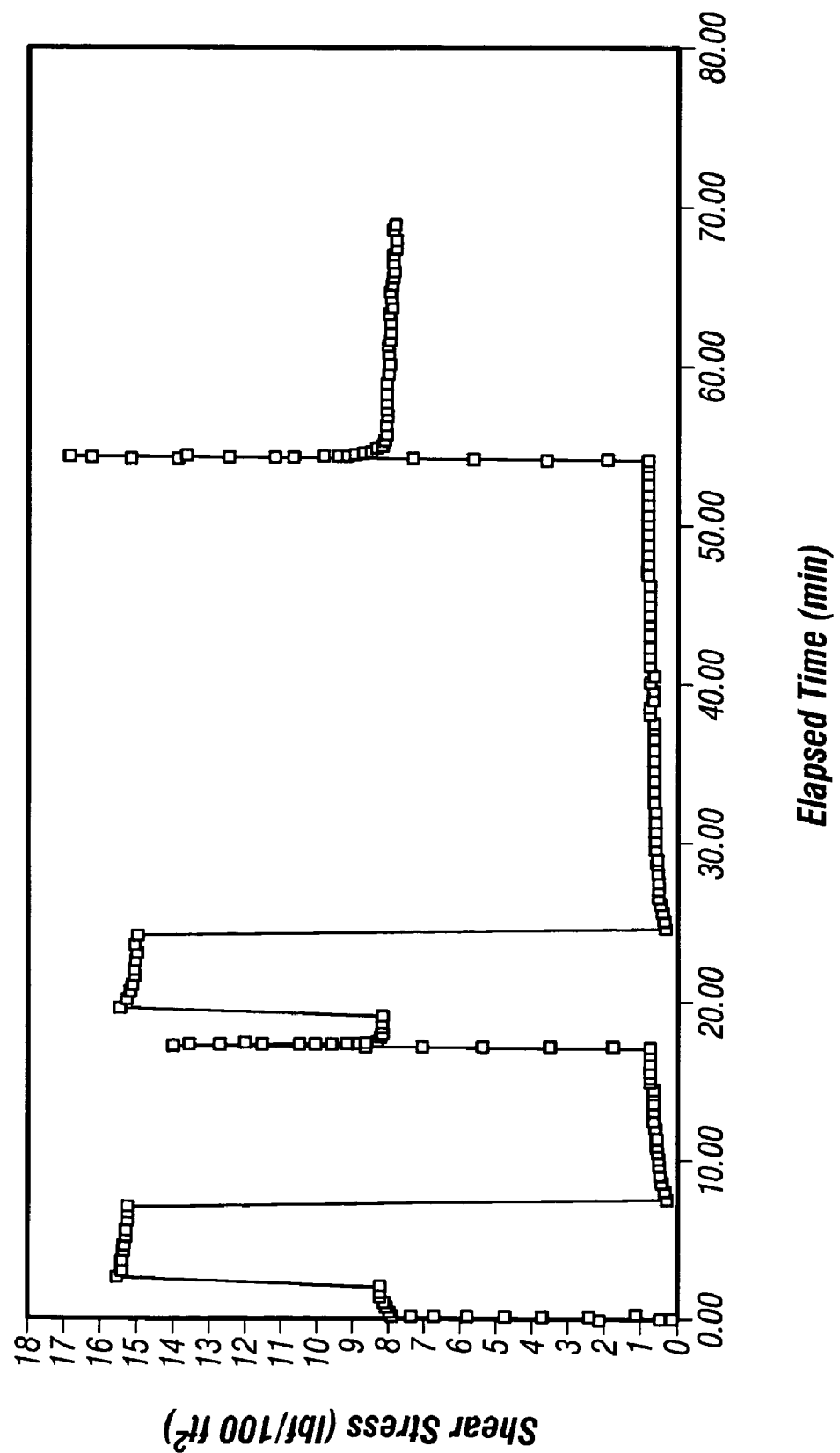

US 7,560,418 B2

ADDITIVES FOR IMPARTING FRAGILE PROGRESSIVE GEL STRUCTURE AND CONTROLLED TEMPORARY VISCOSITY TO OIL BASED DRILLING FLUIDS

BACKGROUND OF THE INVENTION

1. Field of the Invention

The present invention relates to compositions and methods for treating, drilling, cementing, and casing boreholes in subterranean formations, particularly hydrocarbon bearing formations, and to drilling fluids for use in such drilling operations. More particularly, the present invention relates to oil and synthetic fluid based drilling fluids comprising invert emulsions, and drilling fluid additives that enhance suspension characteristics of such drilling fluids, for drilling, and for transport.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Most drilling fluids or muds are water-based. However, oil or synthetic fluid-based muds are normally used to drill swelling or sloughing shales, salt, gypsum, anhydrite or other evaporate formations, hydrogen sulfide-containing formations, and hot (greater than about 300 degrees Fahrenheit ("° F.")) holes, but may be used in other holes penetrating a subterranean formation as well. Unless indicated otherwise, the terms "oil mud" or "oil-based mud or drilling fluid" shall be understood to include synthetic oils or other synthetic fluids as well as natural or traditional oils, and such oils shall be understood to comprise invert emulsions as well as all oil systems.

A key parameter to drilling fluid performance is the ability of the fluid to gel upon standing. This property is very important, as the gel formed must form quickly enough and be strong enough to adequately suspend drill solids and weighting materials in the well-bore annulus while not being so strong as to be unbreakable or to cause excessive differences in the drilling fluid surface density and equivalent circulating density (ECD) downhole when circulation of the drilling fluid is restored.

Clay-containing, water-based drilling fluids typically gel satisfactorily. However, most oil based drilling fluids exhibit gel structures that are either "flat" or too strong. A "flat" gel does not build substantial strength over time. A gel that is too strong builds progressive gel strength over time, but the gel is harder to break when fluid flow is restored. Further, when these harder-to-break gels are finally broken, they typically shear thin back slowly to their previous viscosity, rather than quickly returning to a shear thinned rheology commonly seen with water-based drilling fluids or even the "flat" gel (oil based) fluids.

An exception to these generalities are the "fragile gel" drilling fluids taught in U.S. Pat. No. 6,887,832 B2, filed Jun. 19, 2002 and issued May 3, 2005, of Jeff Kirsner, et al. and assigned to Halliburton Energy Services, Inc., Duncan, Okla., the entire content of which is incorporated herein by reference, and U.S. patent application Ser. No. 10/292,124, filed Nov. 12, 2002, of Jeff Kirsner, et al. and assigned to Halliburton Energy Services, Inc., the entire content of which is incorporated herein by reference. The fluids of that patent and patent application are oil (or synthetic fluid)-based, and yet quickly build a gel type structure on standing that is easy to break when fluid flow is restarted, closely mimicking the behavior of water-based drilling fluids. There remains, however, a desire to be able to impart fragile gel behavior or fragile progressive gel structure to a broader range of oil-based drilling fluids than the fluids disclosed in that patent and patent application.

The ability of a drilling fluid to suspend drill solids and weighting materials has commonly been associated with the viscosity of the fluid, although the concepts of suspension ability and viscosity have differences. Nevertheless, increasing the fluid viscosity is often seen as an effective means of suspending weighting materials and drill solids in the fluid. Such increase is commonly effected by adding organo-clays or viscosifying polymers and surfactants to the fluid. Increasing viscosity, however, can negatively impact fluid rheology, risking making the fluid too thick for optimal drilling conditions. Also, organo-clays add solid particles to the fluid which reduce the amount of drill solids the fluid can tolerate and thereby reduce the useful drilling lifetime of the fluid without treatment. Surfactants can interact with emulsion(s) already present in the drilling fluid, changing the fluid flow properties and rendering fluid performance less predictable.

Suspension of weighting materials in drilling fluid is important not only during drilling, but also during transport of drilling fluid to the drilling site. Oil-based drilling fluids are typically prepared at a mixing plant and transported to a drilling site (also called a rig site), often by boat. Such transport time can range from a few days to several weeks during which time the weighting material in the fluid can settle out of the fluid to the bottom of the transport vessel. Such settling increases expense in cleaning the transport vessel and changes the fluid weights. Currently, the fluid is keep circulating during transport to avoid settling or is rendered very thick with permanent or temporary viscosifiers.

There continues to be a need, and consequent search, for improved ways of enhancing the ability of oil-based drilling fluids to suspend weighing materials and drill cuttings.

SUMMARY OF THE INVENTION

The present invention provides compositions and methods for imparting fragile gel like suspension properties or fragile progressive gel structure to a variety of oil-based drilling fluids, or more particularly, invert emulsion-based drilling fluids, for use in drilling wellbores in subterranean formations. As used herein, the term "drilling" or "drilling wellbores" shall be understood in the broader sense of drilling operations, which include running casing and cementing as well as drilling, unless specifically indicated otherwise.

The invention also provides compositions and methods for suspending weighting material in a drilling fluid during transport of the fluid, as from a manufacturing or mixing facility to a drilling site. Still further, the invention provides compositions and methods for a viscous sweep during drilling, where such sweep is rheologically compatible with the drilling fluid.

The present invention also provides invert emulsion based drilling fluids employing or comprising the compositions of the invention for use in effecting the advantages of the invention.

The compositions of the present invention comprise a gellant comprising phosphate ester and crosslinking metal. The phosphate ester structure is as follows:

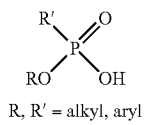

R, R' = alkyl, aryl

The crosslinking metal is selected from Ni (II), Fe(II), Fe(III), Zn(II), Al(III), Co(III).

Organo-clays (also called "organophilic clays") are not necessary to obtain suspension of drill cuttings or other solids and preferably are not used, particularly if the purpose of using the invention is to impart a fragile progressive gel structure to the drilling fluid. The presence of organo-clays is not believed to be a hindrance if the purpose of using the invention is to enhance viscosity of the drilling fluid for transport. However, for the composition of the invention to "gel" the drilling fluid, the drilling fluid must have a pH of less than about 7.5 or more preferably 7.0 or less. Most preferably the fluid has a neutral pH. Adding base or changing the pH of the fluid to basic and heating the fluid to at least about 120° F. will return the fluid to its original viscosity.

The present invention also provides improved methods for drilling boreholes in subterranean formations. Most preferably, these methods provide or employ improved drilling fluids comprising a composition of the invention. Generally, the methods of the invention for drilling boreholes comprise the step of using a drilling fluid that is not dependent on organophilic clays (also called "organo-clays") to obtain suspension of drill cuttings or other solids. Rather, phosphate ester combined with crosslinking metal at a generally neutral pH enables the invert emulsion based drilling fluid to provide or enable suspension of drill cuttings and other solids in a fragile progressive gel type structure. That is, when drilling is stopped while using a drilling fluid of the invention, and consequently when the stresses or forces associated with drilling are substantially reduced or removed, the drilling fluid acts as a gel, suspending/continuing to suspend drill cuttings and other solids (such as for example weighting materials) for delivery to the well surface. When drilling is resumed, the drilling fluid is flowable, acting like a liquid, with relatively little if any appreciable or noticeable pressure spike, particularly as observed by pressure-while-drilling (PWD) equipment or instruments.

BRIEF DESCRIPTION OF THE DRAWINGS

FIG. 1 is a graph of rheological data showing shear stress over time and indicating fragile progressive gel formation in drilling fluids employing additives of the present invention and the response of the drilling fluids when disrupted.

DETAILED DESCRIPTION OF PREFERRED EMBODIMENTS

According to the present invention, phosphate ester and metal (or metallic) cross-linker is used to impart fragile gel like suspension properties or fragile progressive gel structure to oil or invert emulsion based drilling fluids that mimics the progressive gel behavior of water based drilling fluids. Preferably, the phosphate ester and metal crosslinker comprise, or are comprised in, a drilling fluid additive, although alternatively the drilling fluid can be originally formulated comprising the phosphate ester and metal cross-linker. The metal cross-linker should be present in sufficient quantity to at least partially cross-link the phosphate ester when at a neutral or acidic pH.

A "gel" may be defined a number of ways. One definition indicates that a "gel" is a generally colloidal suspension or a mixture of microscopic water particles (and any hydrophilic additives) approximately uniformly dispersed through the oil (and any hydrophobic additives), such that the fluid or gel has a generally homogeneous gelatinous consistency. Another definition states that a "gel" is a colloid in a more solid form than a "sol" and defines a "sol" as a fluid colloidal system, especially one in which the continuous phase is a liquid. Still another definition provides that a "gel" is a colloid in which the disperse phase has combined with the continuous phase to produce a viscous jelly-like product. Generally, a gel has a structure that is continually building. If the yield stress of a fluid increases over time, the fluid has gelled. "Yield stress" is the stress required to be exerted to initiate deformation.

"Progressive gel structure" as used herein generally refers to a gel having a structure that is continually building. A "fragile gel" as used herein is a "gel" that is easily disrupted or thinned, and that liquefies or becomes less gel-like and more liquid-like under stress, such as caused by moving the fluid, but which quickly returns to a gel or gel-like state when the movement or other stress is alleviated or removed, such as when circulation of the fluid is stopped, as for example when drilling is stopped. "Fragile gels" are so "fragile" that it is believed that they may be disrupted by a mere pressure wave or a compression wave during drilling. They break instantaneously when disturbed, reversing from a gel back into a liquid form with minimum pressure, force and time. "Fragile progressive gel structure" as used herein generally refers to a gel that is a fragile gel or has at least some characteristics of a fragile gel and that particularly has a structure that is continually building.

Also according to the present invention, phosphate ester and metal (or metallic) cross-linker is used to reversibly enhance the viscosity of oil or invert emulsion based drilling fluids in order to suspend barite or other weighting agents during transport of the fluid to avoid barite settling. Upon arrival at the destination or in any case prior to use, the fluid viscosity can easily be returned back to its original viscosity by raising the pH of the fluid above neutral.

The amount of phosphate ester and metal crosslinker used in a drilling fluid will depend on oil type, oil volume and desired viscosity of the drilling fluid. Generally, however, more phosphate ester and metal cross-linker is used for gelling or enhancing viscosity of the fluid for transport than is used for imparting fragile progressive gel structure to the drilling fluid. That is, when the composition of the invention is intended for "gelling" or enhancing the viscosity or suspension characteristics of the fluid for transport, the drilling fluid preferably comprises about 0.1 to about 5.0 percent by weight of the phosphate ester and metal cross-linker, with about 0.3 to about 2.5 percent by weight of the phosphate ester and metal cross-linker being most preferred. When the composition of the invention is used for imparting fragile progressive gel structure to a drilling fluid, preferably the drilling fluid comprises about 0.05 to about 1.0 percent by weight of the phosphate ester and metal cross-liker, with about 0.1 to about 0.75 percent by weight phosphate ester and metal cross-linker being most preferred.

Organo-clays (also called "organophilic clays") are not necessary to obtain suspension of drill cuttings or other solids and preferably are not used, particularly if the purpose of using the invention is to impart a fragile progressive gel structure to the drilling fluid. The presence of organo-clays is not believed to be a hindrance if the purpose of using the invention is to enhance viscosity of the drilling fluid for transport.

The drilling fluid must have a neutral or acid pH for the composition of the invention to achieve the advantages of the invention. That is, the phosphate ester and metal cross-linker require a neutral or acidic pH environment to impart fragile progressive gel structure or to enhance the suspension ability of the drilling fluid for weighting agents. Further, addition of a base, such as for example lime, preferably with heating up to at least about 120° F., can readily reverse the effect of the composition of the invention, returning the drilling fluid to its original viscosity and structure as it had before the composition of the invention was added to it.

For use in the present invention, the phosphate ester has the following structure:

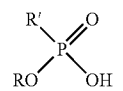

R, R' = alkyl, aryl where R is an alkyl or an aryl group and most preferably is an alkyl group having less than about 5 carbons and R' is an alkyl or an aryl group and most preferably is an alkyl group having about 6 to about 30 carbons. The crosslinking metal is selected from Ni (II), Fe(II), Fe(III), Zn(II), Al(III), or Co(III).

The effectiveness of the invention is demonstrated by the experiments discussed below.

EXPERIMENTAL

Saralene muds containing gel chemistry were designed as indicated in Table 1 and were then formulated up to the step calling for addition of BAROID® weighting agent. The muds were then dynamically aged for 16 hours at 150° F. Example additives comprising compositions of the invention, MY-T-OIL™ V products MO-85 and MO-86, available from Halliburton Energy Services, Inc. in Houston, Tex., were added to the mud samples and stirred on a multimixer for 10 minutes. Full rheology analysis was then done. Initial rheology data for these muds, as set forth in Table 2, indicated that the muds yielded progressive gels. Studying the progressive gels in greater depth with a Brookfield rheometer indicated that the progressive gels were fragile. That is, the progressive gels showed a "snap-back" effect, as demonstrated in the Brookfield data depicted in FIG. 1.

TABLE 1

Mud Formulations

| Fluid Formulations | Sample A | Sample B | Sample C | Sample D |
| --- | --- | --- | --- | --- |
| Saraline-185 (bbl) | 0.621 | 0.621 | 0.621 | 0.621 |
| Water (bbl) | 0.160 | 0.160 | 0.160 | 0.160 |
| CaCl₂ (ppb) | 19.4 | 19.4 | 19.4 | 19.4 |
| GELTONE ® II | 8.0 | 8.0 | 8.0 | 8.0 |
| EZ MUL NT ™ | 6.0 | 6.0 | 6.0 | 6.0 |
| INVERMUL NT ™ | 6.0 | 6.0 | 6.0 | 6.0 |
| ADAPTA ® | 2.5 | 2.5 | 2.5 | 2.5 |
| Lime | 4.0 | 4.0 | 4.0 | 4.0 |
| X-VIS ™ | 0.5 | 0.5 | 0.5 | 0.5 |
| BAROID ® | 238.3 | 238.3 | 238.3 | 238.3 |
| MO85 (ppb) | 0.0 | 0.4 | 0.7 | 1.4 |
| MO86 (ppb) | 0.0 | 0.4 | 0.7 | 1.4 |

TABLE 1-continued

Mud Formulations

| Fluid Formulations | Sample A | Sample B | Sample C | Sample D |
| --- | --- | --- | --- | --- |

All trademarked products in Table 1 are available from Halliburton Energy Services, Inc. in Houston, Tex., including: GELTONE® II viscosifier (organophilic clay); EZ MUL NT™ emulsifier or emulsion stabilizer; INVERMUL NT™ emulsifier; ADAPTA® filtration control agent (copolymer particularly suited for providing HPHT filtration control in non-aqueous fluid systems); X-VIS™ suspension agent; BAROID® weighting agent (ground barium sulfate).

TABLE 2

Rheology Data

| Fann 35A data at 70° F. | Sample A | Sample B | Sample C | Sample D |
| --- | --- | --- | --- | --- |
| 600 rpm | 114 | 109 | 111 | 108 |
| 300 rpm | 66 | 65 | 65 | 62 |
| 200 rpm | 49 | 48 | 47 | 46 |
| 100 rpm | 32 | 30 | 31 | 29 |
| 6 rpm | 10 | 8 | 9 | 9 |
| 3 rpm | 9 | 8 | 9 | 8 |
| PV, cP | 48 | 44 | 46 | 46 |
| YP, lb/100 ft² | 18 | 21 | 19 | 16 |
| 10 sec. gel, lb/100 ft² | 16 | 14 | 15 | 14 |
| 10 min. gel, lb/100 ft² | 23 | 28 | 30 | 28 |
| 30 min. gel, lb/100 ft² | 33 | 30 | 32 | 35 |

The ability of the compositions of the invention to control drilling fluid viscosity and provide for a temporary viscosity increase without adding a material that detrimentally alters the fluid performance is also demonstrated by laboratory experiments. Standard drilling fluid formulations were designed as indicated in Table 3. The formulations were undertaken by adding the listed additives in the order presented in Table 3 up to CaCl₂. The formulations were then aged at 150° F. for 16 hours. Afterwards, example additives comprising compositions of the invention MO-85 and MO-86 were added to the formulation samples and stirred for 10 minutes on a Hamilton-Beach Multimixer. Rheological measurements were taken and analyzed as indicated in Table 4. To each sample, 1 ppb of lime was added to confirm breakdown of gel and subsequent return of the base fluid rheological properties. Rheological measurements for these samples is provided in Table 5. The baseline or "control" samples were numbered "1" in Tables 3, 4, and 5.

TABLE 3

Formulations (Initial Fluids)

| Fluid Formulations | 1 | 2 | 3 | 4 |
| --- | --- | --- | --- | --- |
| ACCOLADE ® (bbl) | 0.545 | 0.545 | 0.545 | 0.545 |
| LE SUPERMUL ™ (ppb) | 8.0 | 8.0 | 8.0 | 8.0 |
| ADAPTA ® (ppb) | 2.0 | 2.0 | 2.0 | 2.0 |
| RHEMOD L ™ (ppb) | 0.2 | 0.2 | 0.2 | 0.2 |
| Water (bbl) | 0.200 | 0.200 | 0.200 | 0.200 |
| BAROID ® (ppb) | 219.1 | 219.1 | 219.1 | 219.1 |
| CaCl₂ (ppb) | 30.0 | 30.0 | 30.0 | 30.0 |
| MO85 (ppb) | 0.0 | 0.28 | 0.42 | 0.7 |
| MO86 (ppb) | 0.0 | 0.28 | 0.42 | 0.7 |

All trademarked products in Table 3 are available from Halliburton Energy Services, Inc. in Houston, Tex., including: ACCOLADE® drilling fluid; LE SUPERMUL™ emulsifier; ADAPTA® filtration control agent (copolymer particularly suited for providing HPHT filtration control in non-aqueous fluid systems); RHEMOD L™ suspension agent/viscosifier (modified fatty acid); and BAROID® weighting agent (ground barium sulfate).

TABLE 4

Rheology (Initial Fluids)

| Fann 35A data at 70° F. | 1 | 2 | 3 | 4 |
|---|---|---|---|---|
| 600 rpm | 98 | 131 | 200 | x |
| 300 rpm | 68 | 72 | 120 | 270 |
| 200 rpm | 52 | 55 | 89 | 218 |
| 100 rpm | 38 | 35 | 59 | 155 |
| 6 rpm | 14 | 10 | 17 | 59 |
| 3 rpm | 12 | 7 | 14 | 52 |
| PV, cP | 30 | 59 | 80 | — |
| YP, lb/100 ft$^2$ | 38 | 13 | 40 | — |
| 10 sec. gel, lb/100 ft$^2$ | 12 | 11 | 18 | 52 |
| 10 min. gel, lb/100 ft$^2$ | 12 | 14 | 24 | 70 |
| 30 min. gel, lb/100 ft$^2$ | 14 | 13 | 23 | 80 |

TABLE 5

Rheology after lime added, followed by heating

| Fann 35A data at 70° F. | 1 | 2 | 3 | 4 |
|---|---|---|---|---|
| 600 rpm | 85 | 84 | 82 | 94 |
| 300 rpm | 44 | 44 | 43 | 52 |
| 200 rpm | 30 | 30 | 30 | 36 |
| 100 rpm | 16 | 17 | 17 | 20 |
| 6 rpm | 3 | 4 | 3 | 4 |
| 3 rpm | 2 | 3 | 2 | 3 |
| PV, cP | 41 | 40 | 39 | 42 |
| YP, lb/100 ft$^2$ | 3 | 4 | 4 | 10 |
| 10 sec. gel, lb/100 ft$^2$ | 3 | 4 | 3 | 4 |
| 10 min. gel, lb/100 ft$^2$ | 3 | 5 | 4 | 4 |
| 30 min. gel, lb/100 ft$^2$ | 5 | 6 | 4 | 5 |

The formulations set forth in Table 3 were prepared again, as set forth in Table 6, then statically aged at room temperature and rheological data taken, set forth in Table 7, and then further statically aged at an elevated temperature (150° F.), as indicated in Table 8.

TABLE 6

Formulations (Initial Fluids)

| Fluid Formulations | 5 | 6 | 7 |
|---|---|---|---|
| ACCOLADE ® (bbl) | 0.545 | 0.545 | 0.545 |
| LE SUPERMUL ™ (ppb) | 8.0 | 8.0 | 8.0 |
| ADAPTA ® (ppb) | 2.0 | 2.0 | 2.0 |
| RHEMOD L ™ (ppb) | 0.2 | 0.2 | 0.2 |
| Water (bbl) | 0.200 | 0.200 | 0.200 |
| BAROID ® (ppb) | 219.1 | 219.1 | 219.1 |
| CaCl$_2$ (ppb) | 30.0 | 30.0 | 30.0 |
| MO85 (ppb) | 0.0 | 0.28 | 0.42 |
| MO86 (ppb) | 0.0 | 0.28 | 0.42 |

TABLE 7

Rheology (Static Aging at Room Temp. for 5 days)

| Fann 35A data at 70° F. | 5 | 6 | 7 |
|---|---|---|---|
| 600 rpm | 98 | 83 | 89 |
| 300 rpm | 68 | 54 | 57 |
| 200 rpm | 53 | 42 | 43 |
| 100 rpm | 38 | 29 | 30 |
| 6 rpm | 14 | 10 | 10 |
| 3 rpm | 12 | 12 | 9 |
| PV, cP | 30 | 29 | 32 |
| YP, lb/100 ft$^2$ | 38 | 25 | 25 |
| 10 sec. gel, lb/100 ft$^2$ | 12 | 9 | 11 |
| 10 min. gel, lb/100 ft$^2$ | 12 | 13 | 14 |
| 30 min. gel, lb/100 ft$^2$ | 14 | 17 | 20 |
| Top oil after 5 days (ml) | 10 | 1.5 | 1.0 |

TABLE 8

(Static Aging 2 Days at 150° F.)

| Fluid Formulations | 5 | 6 | 7 |
|---|---|---|---|
| Oil/Mud Ratio | 1.25 | 1.01 | 1.00 |
| Mass of 10/ml (g) | 19.45 | 15.44 | 14.1 |
| Density of Natant (ppg) | 10.2 | 9.6 | 9.65 |
| Whole Density | 12.2 | 11.9 | 11.8 |
| Natant/Whole Ratio | 1.20 | 1.24 | 1.22 |
| Natant/10 ml Ratio | 1.59 | 1.34 | .122 |

The initial static aging results (Tables 4, 7, and 8) indicated that increased amount of composition of the invention increased rheology accordingly. However, initial top oil studies (Table 7) indicated that increased amount of composition of the invention improved the amount of top oil present. This indication is further supported by the data from samples static aged at elevated temperatures; the 0.5 wt % (0.42 ppb) sample had the lowest top oil/whole mud ratio. Additionally, the data indicated that addition of lime and heat was sufficient to "break back" these gels to a typical drilling fluid character as shown in Table 5.

Further tests were conducted to indicate the effect of constant listing motion, such as a fluid might encounter in ship transport, on drilling fluids containing compositions of the invention. Fluids were tested in a device that mimicked "boat-rocking" motions, and these tests were conducted at room temperature and at an elevated temperature (120° F.) as might be encountered by the fluids in transport in summer. Data from these tests is shown in Tables 9, 10, and 11.

TABLE 9

Formulations for Boat-Rocking Tests

| Fluid Formulations | 8 | 9 | 10 | 11 |
|---|---|---|---|---|
| ACCOLADE ® (bbl) | 153.4 | 153.4 | 153.4 | 153.4 |
| LE SUPERMUL ™ (ppb) | 8.0 | 8.0 | 8.0 | 8.0 |
| ADAPTA ® (ppb) | 2.0 | 2.0 | 2.0 | 2.0 |
| RHEMOD L ™ (ppb) | 0.2 | 0.2 | 0.2 | 0.2 |
| Water (bbl) | 0.200 | 0.200 | 0.200 | 0.200 |
| BAROID ® (ppb) | 219.1 | 219.1 | 219.1 | 219.1 |
| CaCl$_2$ (ppb) | 30.0 | 30.0 | 30.0 | 30.0 |
| MO85 (ppb) | 0.0 | 0.5 | 0.7 | 1.4 |
| MO86 (ppb) | 0.0 | 0.5 | 0.7 | 1.4 |

TABLE 10

| (Boat Rocking at Room Temp.) | | | | |
|---|---|---|---|---|
| Fluid Formulations | 8 | 9 | 10 | 11 |
| Oil/Mud Ratio | 1.36 | 1.08 | 1.02 | 0.00 |
| Mass of 10/ml (g) | 19.18 | 17.4 | 17.38 | 15.83 |
| Density of Natant (ppg) | 11.60 | 11.30 | 11.65 | 12.05 |
| Whole Density | 11.8 | 11.9 | 11.9 | 11.9 |
| Natant/Whole Ratio | 10.018 | 1.053 | 1.022 | 0.987 |
| Natant/10 ml Ratio | 1.379 | 1.284 | 1.244 | 1.095 |

TABLE 11

| (Boat Rocking at Elevated Temp. (120° F.)) | | | | |
|---|---|---|---|---|
| Fluid Formulations | 8 | 9 | 10 | 11 |
| Oil/Mud Ratio | 1.25 | 1.01 | 1.00 | 1.00 |
| Mass of 10/ml (g) | 19.45 | 15.44 | 14.10 | 16.96 |
| Density of Natant (ppg) | 10.8 | 9.60 | 9.65 | 12.11 |
| Whole Density | 16.2 | 12.9 | 11.8 | 14.1 |
| Natant/Whole Ratio | 1.50 | 1.34 | 1.22 | 1.17 |
| Natant/10 ml Ratio | 1.80 | 1.61 | 1.46 | 1.40 |

The natant/whole ratio is an indication of the amount of barite that has settled out from the fluid. A higher ratio means more barite has settled out. The natant/10 ml ratio is an indication of distribution of weighted material within the drilling fluid portion (stratification of weight). A high ratio indicates a lot of weighted material has settled within the fluid, but has not completely settled out of the fluid. A good gellant material is one that reduces both of these ratios (as the gellant has then effectively prevented settling within the fluid, which consequently prevents the settling out of weighted material). The data above indicates that the gel system of the invention successfully reduced the amount of settling (samples 9-11) compared with the standard drilling fluid (sample 8). In particular, increased gellant loading improved the anti-settling effects to the point where very little oiling-out was measured (Oil/Mud Ratio), and significantly reduced settled solids (low natant/whole ratio). This result was even seen with raised temperature rocking, an environment most likely to cause disruption to the supporting gel structures.

The foregoing description of the invention is intended to be a description of preferred embodiments. Various changes in the details of the described fluids and methods of use can be made without departing from the intended scope of this invention as defined by the appended claims.

What is claimed is:

1. A method for imparting fragile progressive gel type structure to an invert emulsion based drilling fluid, said method comprising the steps of:
   providing or adjusting the pH of said drilling fluid to be about 7.0 or less;
   adding phosphate ester to said drilling fluid; and
   adding cross-linking metal to said drilling fluid, wherein said cross-linking metal is capable of at least partially cross-linking said phosphate ester at said pH and wherein said metal is provided in sufficient quantity to at least partially cross-link said phosphate ester.

2. The method of claim 1 wherein said phosphate ester has the structure:

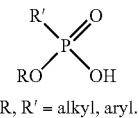

R, R' = alkyl, aryl.

3. The method of claim 2 wherein R is an alkyl group having less than about 5 carbons and R' is an alkyl group having about 6 to about 30 carbons.

4. The method of claim 1 wherein the metal is selected from the group consisting of Ni (II), Fe(II), Fe(III), Zn(II), Al(III), and Co(III).

5. A drilling fluid not dependent on organophilic clays to suspend drill cuttings, said drilling fluid comprising phosphate ester at least partially crosslinked by a cross-linking metal at neutral or acidic pH.

6. The drilling fluid of claim 5 further comprising an invert emulsion base having a fragile progressive gel type structure.

7. The drilling fluid of claim 6 wherein the phosphate ester has the structure:

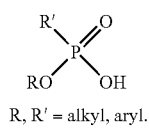

R, R' = alkyl, aryl.

8. The drilling fluid of claim 7 wherein R is an alkyl group having less than about 5 carbons and R' is an alkyl group having about 6 to about 30 carbons.

9. The drilling fluid of claim 8 wherein the cross-linking metal is selected from the group consisting of Ni (II), Fe(II), Fe(III), Zn(II), Al(III), and Co(III).

10. The drilling fluid of claim 9 wherein the drilling fluid comprises about 0.05 to about 1.0 percent by weight phosphate ester and cross-linking metal.

11. The drilling fluid of claim 5 wherein the pH is neutral.

12. The drilling fluid of claim 5 wherein the pH is acidic.

13. A method for reversibly imparting fragile progressive gel structure to an invert emulsion based drilling fluid, said method comprising employing in the drilling fluid an additive comprising a phosphate ester and a cross-linking metal so that at neutral or acidic pH, the drilling fluid has an oil/mud ratio of less than or about 1.08, a natant/whole ratio of less than or about 1.34, and a natant/10 ml ratio of less than or about 1.61, and at basic pH, the drilling fluid has its original viscosity.

14. The method of claim 13 wherein said fluid pH is made neutral or acidic for transport.

15. The method of claim 13 wherein said fluid pH is made neutral or acidic for use in drilling a wellbore in a subterranean formation.

16. A method for reversibly enhancing the suspension characteristics of an oil or invert emulsion based drilling fluid, said method comprising employing an additive in said drilling fluid comprising a phosphate ester and a cross-linking metal and providing or adjusting the pH of said fluid to be neutral or acidic and, wherein the pH of the fluid is made basic to return the drilling fluid to its original viscosity or suspension characteristics.

17. The method of claim 16 wherein the enhanced suspension is for fluid transport.

18. The method of claim 16 wherein the drilling fluid comprises about 0.1 to about 5.0 percent by weight phosphate ester and cross-linking metal.

* * * * *